United States Patent [19]
Choi

[11] Patent Number: 5,523,188
[45] Date of Patent: Jun. 4, 1996

[54] METHOD FOR MANUFACTURING A LIGHT-DISPERSION TYPE LIQUID CRYSTAL DISPLAY DEVICE

[75] Inventor: Woo-ho Choi, Seoul, Rep. of Korea

[73] Assignee: Samsung Electronics Co., Ltd., Suwon, Rep. of Korea

[21] Appl. No.: 378,312

[22] Filed: Jan. 25, 1995

Related U.S. Application Data

[63] Continuation of Ser. No. 155,258, Nov. 22, 1993, abandoned.

[30] Foreign Application Priority Data

Nov. 26, 1992 [KR] Rep. of Korea .................. 92-22406

[51] Int. Cl.⁶ .................. C09K 19/00; G02F 1/133; G02F 1/1335; G03C 5/00
[52] U.S. Cl. .................. 430/20; 430/314; 430/315; 430/317; 359/53; 359/62
[58] Field of Search .................. 430/20, 314, 315, 430/317; 359/53, 62

[56] References Cited

U.S. PATENT DOCUMENTS

| | | | |
|---|---|---|---|
| 3,886,014 | 5/1975 | Bayer | 156/145 |
| 3,952,405 | 4/1976 | Vest | 430/315 |
| 4,581,608 | 4/1986 | Aftergut et al. | 340/704 |
| 4,659,182 | 4/1987 | Aizawa | 350/335 |
| 4,813,770 | 3/1989 | Clerc et al. | 350/347 E |
| 4,878,741 | 11/1989 | Fergason | 350/334 |
| 4,886,343 | 12/1989 | Johnson | 350/335 |
| 5,113,272 | 5/1992 | Reamey | 359/53 |
| 5,221,978 | 6/1993 | Heynderickx et al. | 359/53 |
| 5,248,576 | 9/1993 | Yokoyama et al. | 430/7 |
| 5,276,538 | 1/1994 | Monji et al. | 359/40 |
| 5,304,439 | 4/1994 | Disanto et al. | 430/20 |
| 5,304,460 | 4/1994 | Fulton et al. | 430/313 |
| 5,320,932 | 6/1994 | Haraguchi et al. | 430/313 |
| 5,386,307 | 1/1995 | Jang | 359/62 |
| 5,392,141 | 2/1995 | Jang | 359/62 |
| 5,414,545 | 5/1995 | Lee | 359/53 |
| 5,418,633 | 5/1995 | Kim et al. | 359/53 |
| 5,463,481 | 10/1995 | Yamamura | 359/53 |

FOREIGN PATENT DOCUMENTS

| | | | |
|---|---|---|---|
| 5118015 | 9/1980 | Japan | 359/53 |
| 57-196214 | 2/1982 | Japan . | |
| 5072513 | 3/1993 | Japan | 359/62 |

Primary Examiner—Charles L. Bowers, Jr.
Assistant Examiner—J. Pasterczyk
Attorney, Agent, or Firm—Cushman Darby & Cushman

[57] ABSTRACT

Disclosed is a method for manufacturing a multilayer light-diffusion-type LCD device having an electrical field effect type liquid crystal layer formed between two opposing electrodes and formed of liquid crystal in the multiple layers which are partitioned by insulation layers, and column means for fixing the location of the plurality of the insulation layers between the liquid crystal multi-layers. The method includes the steps of forming a first electrode on the substrate, using a photosensitive material for the formation of a medium layer in which columns and cavities are to be formed, the cavities being filled up with the liquid crystal, alternately coating the insulation layer and the photosensitive medium layer, and partially exposing the laminated structure with a predetermined pattern so as to provide an etching selectivity between the exposed photosensitive layers and the unexposed photosensitive layers.

4 Claims, 14 Drawing Sheets

METHOD FOR MANUFACTURING A LIGHT-DISPERSION TYPE LIQUID CRYSTAL DISPLAY DEVICE

This is a Continuation of application Ser. No. 08/155,258, filed on Nov. 22, 1993, which was abandoned upon the filing hereof.

BACKGROUND OF THE INVENTION

The present invention relates to a method for manufacturing a liquid crystal display device, and more particularly to a method for manufacturing a multi-layer liquid crystal display having multiple liquid crystal layers.

Conventional liquid crystal display (LCD) devices operate at low driving voltages, and, thus, consume relatively little electrical power. Accordingly, the LCD represents a significant development in technology and has been adopted in many applications. A polarized glass plate is typically used to control the amount of incident light applied to the LCD in conjunction with an active matrix including a simple X-Y matrix, or a thin film transistor (TFT) driving method. In other words, conventional twisted nematic (TN) type and super-twisted nematic (STN) type LCD devices require a polarized plate to control incident light. However, the polarized plate in the LCD intercepts more than 50% of the incident light while controlling light polarization, thereby reducing the efficiency of light use. For this reason, a background light source having a considerable brightness is required to obtain a picture image having acceptable brightness. Thus, in the case of a laptop word processor or computer which uses a dry cell battery or an accumulative battery cell as a power supply source, extended use is limited due to the excessive power consumption of the light source.

Also, in the conventional LCD including TN and STN matrix types, since liquid crystal is charged between two glass plates, it is necessary for a cell gap which is a light-controlled area to be strictly adjusted in order to form a uniform picture image. However, due to current technological limitations in the manufacturing of the glass plate, super-enlarging of an LCD panel is difficult to achieve.

Taking the above-described problems into consideration, to decrease the burden of cell gap adjustment, it is preferable that one sheet of glass substrate is used and that the polarized plate is not used to thereby increase efficiency in the use of light. Of course, LCDs without polarized plates do exist. Examples of such LCDs include a cholesteric nematic transition (CNT) type which uses a phase transition effect and a dynamic scattering mode (DSM) type which was devised during early LCD development. The DSM type LCD exhibits a slow response time and cannot be made thin, so that it is no longer in common use.

Also, another example of an LCD not using a polarized plate to increase the efficiency of light is a polymer-dispersed liquid crystal display (PDLCD). However, since the PDLCD is made of a polymer material more than half of whose volume is light-transmitting, the scattering of light should be brought about to obtain a clear contrast ratio. To attain these requirements, there is a structural limitation in that the thickness of the liquid crystal layer should be at least 20 μm.

An LCD which adopts an electrical field effect type liquid crystal having a new structure in which the above conventional problems of the LCD are considerably improved, has been developed by Nobuyuki Yamamura and was filed on May 8, 1992 as Japanese patent application No. Hei 4-116146.

The above LCD has a fast driving speed and high light-utilization efficiency, in which the liquid crystal layer provided between the opposing electrodes is isolated by a plurality of insulation layers to form a multi-layer structure, the polarized plate is not used and only a single sheet of a glass substrate is applied.

A method for manufacturing a light-dispersion type liquid crystal display (LCD) device (devised by Nobuyuki Yamamura) is described hereinafter.

FIG. 1 is a schematic perspective view of the light-dispersion type LCD device and FIG. 2 is a plan-view of the LCD device as shown in FIG. 1. Referring to FIGS. 1 and 2, the LCD device has a plurality of field-effect type liquid crystal layers 11 between two opposing electrodes, i.e., first and second electrodes 2 and 8, with the liquid crystal layers supported by columns 13 located therebetween and acting as spacers; insulation layers 3 for separating liquid crystal layers 11 into a number of layers; and a plurality of liquid crystal inlet holes 10 for injecting the liquid crystal therethrough.

The thickness of each liquid crystal layer 11 is less than 3 μm and the thickness of the insulation layer 3 is less than 5 μm. In addition, the insulation layers 3 are generally made of light-transmitting epoxy resin or acrylic resin, but can be made of metal oxides, particularly, aluminum oxide.

The method for manufacturing a liquid crystal device is hereinafter described with reference to FIGS. 3A through 9B. Here, those figures having an "A" suffix are sectional views along A–A' of FIG. 2, while those having a "B" suffix are sectional views along B–B' of FIG. 2.

1) Indium tin oxide (ITO), which is a conductive material, is deposited on the surface of plastic or glass substrate 1. Then, a first electrode 2 having a predetermined pattern is formed by means of a photolithographic process (FIGS. 3A and 3B).

2) On the whole surface of substrate 1 on which first electrode 2 is formed, insulation layers 3 comprised of light-transmitting resin (for example, epoxy resin or acrylic resin) and dissolution layers 4 comprised of polyvinyl alcohol (PVA) are repetitively deposited using a spin coating method and a roll coating method, respectively (FIGS. 4A and 4B).

3) A second photolithographic process is performed for forming columns, which will be described hereinbelow, upon the top surface of the laminated structure. That is, photoresist 5 which is a light-sensitive resin is coated and then patterned to produce predetermined column-use holes 6. Thereafter, the portions which are not covered with photoresist are etched to thereby form column-use holes 6 (FIGS. 5A and 5B).

4) Photoresist 5 is removed. Then, column-use holes 6 are filled with light-transmitting insulation resin, and simultaneously, the insulation resin coats the whole surface of the laminated structure, so that columns 13 and insulation layers 7 are formed (FIGS. 6A and 6B).

5) ITO is deposited on insulation layer 7, so that second electrode 8 is formed opposing first electrode 2 on the upper surface of columns 13, by means of a photolithographic process (FIGS. 7A and 7B).

6) Photoresist is coated on the upper surface of the laminated structure. Then, a photolithographic process is performed so that the liquid crystal inlet holes 10 reach first electrode 2. Next, water, acetone or alcohol is injected through inlet holes 10, and thereby dissolution layer 4, i.e., PVA layer, is dissolved and removed. As a result, the liquid crystal inlet holes 10 and dissolution layers 4 become cavities 9, and insulation layers 3 support cavities 9 as columns (FIGS. 8A and 8B).

7) This partially manufactured liquid crystal device (LCD) is dried and then coated with liquid crystal in a vacuum. The pressure is then increased to the atmospheric pressure, whereby the liquid crystal permeates cavities 9 along liquid crystal inlet holes 10 so that a liquid crystal layer 11 is formed. When the filling of the liquid crystal is finished, a light transmitting insulation resin is coated on the whole surface of the laminated structure for sealing, to thereby form a protective layer 12. Accordingly, a desired product is obtained (FIGS. 9A and 9B).

However, in the manufacturing method, for forming the columns, a dry or wet etching should be performed in the second photolithographic process, and light-transmitting insulation resin should be coated, whereby the column-use holes are filled up.

At this time, after the filling is completed, the periphery of the column-use holes is stepped concavely by the influence of the holes, which can cause a degradation of step coverage (the ratio of coating on the sloped portion to that of the flat portion, when any kind of thin film is coated) in the second ITO deposition.

Therefore, after the formation of the second electrode (ITO electrode), when the liquid crystal inlet holes are formed and the dissolution layers are etched away, a wet etching should be performed for many hours. In this case, second electrodes formed around the column-use holes become severely swollen or lifted due to a peeling phenomenon.

SUMMARY OF THE INVENTION

It is an object of the present invention to provide a method for manufacturing a light-dispersion-type liquid display device having an improved structure, by simplifying the column-forming process and obtaining better flatness around the column-use holes.

To accomplish the object of the present invention, there is provided a method for manufacturing a liquid crystal display device comprising an electrical field effect type liquid crystal layer formed between two opposing electrodes and formed of liquid crystal in the multiple layers which are partitioned by insulation layers, and column means for fixing the location of the plurality of the insulation layers between the liquid crystal multi-layers, the method comprising the steps of:

(a) coating a light-transmitting material on the substrate, to thereby form an insulation layer;

(b) coating a photosensitive material to a predetermined thickness on the light-transmitting insulation layer, to thereby form a medium layer;

(c) repeating the steps (a) and (b) a predetermined number of times, to thereby obtain a multilayer structure with a predetermined thickness;

(d) exposing the medium layers located between the insulation layers, which are obtained via the steps (a) through (c), into a predetermined pattern, to thereby form dissolution regions which can be dissolved by a solvent and column regions which cannot be dissolved:

(e) forming in the laminated structure obtained by the steps (a) through (c) liquid crystal inlet holes for injecting the liquid crystal into a predetermined depth; and (f) applying an etchant to the medium layers through the liquid crystal inlet holes, to thereby remove the dissolution layers consisting of the exposed photosensitive material, among the medium layers, whereby multiple layer cavities to be filled with the liquid crystal and columns composed of unexposed photosensitive material are obtained.

In addition, a more detailed manufacturing method according to the present invention includes the steps of:

(a) forming a first electrode group with a conductive material on an electrically insulating glass substrate, with the first electrode group having a predetermined pattern;

(b) coating an electrically insulating and light-transmitting material on the substrate on which the first electrode group is formed, to thereby form an insulation layer;

(c) coating a photosensitive material to a predetermined thickness on the surface of the light-transmitting insulation layer, to thereby form a medium layer;

(d) repeating the steps (b) and (c) a predetermined number of times, to thereby form a multilayer laminated structure with a predetermined thickness;

(e) exposing the medium layers located between the electrical insulation layers, which are obtained via the steps (b) through (d), into a predetermined pattern, to thereby form dissolution regions which can be dissolved by a solvent and column regions which cannot be dissolved;

(f) forming a light-transmitting second electrode into a predetermined pattern on the multilayer laminated structure obtained by the all steps (a) through (e);

(g) forming in the laminated structure obtained by the steps (b) through (d) liquid crystal inlet holes for injecting the liquid crystal into a predetermined depth;

(h) applying an etchant to the medium layers through the liquid crystal inlet holes, to thereby remove the dissolution layers consisting of the exposed photosensitive material, among the medium layers, whereby multiple layer cavities to be filled with the liquid crystal and columns comprised of unexposed photosensitive material are obtained; and (i) filling the cavities with liquid crystal via the liquid crystal inlet holes and sealing the liquid crystal inlet holes, and forming a light-transmitting insulating protective layer on the surface of the laminated structure.

Furthermore, another aspect of the manufacturing method according to the present invention includes the steps of:

(a) forming a first electrode group with a conductive material on an electrically-insulating glass substrate, with the first electrode group having a predetermined pattern;

(b) coating all electrically insulating and light-transmitting material on the substrate on which the first electrode group is formed, to thereby form an insulation layer;

(c) coating a photosensitive material to a predetermined thickness on the surface of the light-transmitting insulation layer, to thereby form a medium layer;

(d) repeating the steps (b) and (c) a predetermined number of times, to thereby form a multilayer laminated structure with a predetermined thickness;

(e) exposing the medium layers located between the electrical insulation layers, which are obtained via the steps (b) through (d), into a predetermined pattern, to thereby form dissolution regions which can be dissolved by a solvent and column regions which cannot be dissolved;

(f) forming in the laminated structure obtained by the steps (b) through (d) liquid crystal inlet holes for injecting the liquid crystal into a predetermined depth;

(g) applying an etchant to the medium layers through the liquid crystal inlet holes, to thereby remove the dissolution layers consisting of the exposed photosensitive material, among the medium layers, whereby multiple layer cavities to be filled with the liquid crystal and columns comprised of unexposed photosensitive material are obtained; and (h) filling the cavities with liquid crystal via the liquid crystal inlet holes and sealing the liquid crystal inlet holes;

(i) forming a light-transmitting second electrode into a predetermined pattern on the multilayer laminated structure obtained by the above steps (a) through (h); and (j) forming a light-transmitting electrode protective layer on the surface of the laminated structure.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

Figure 1:
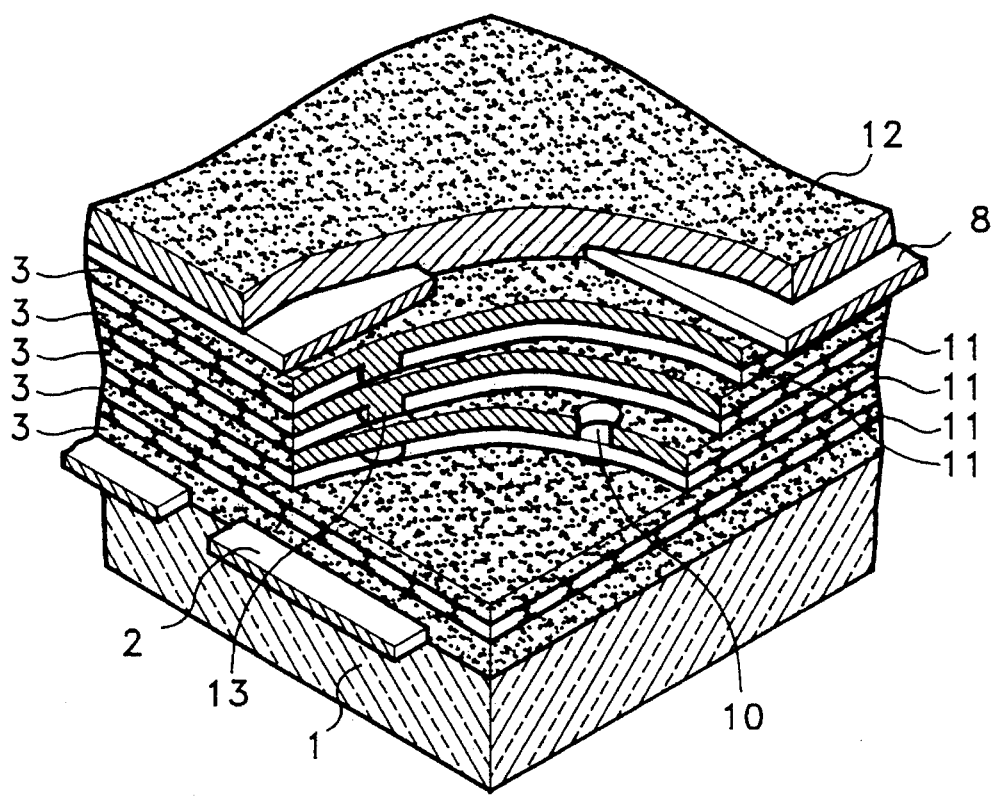
FIG. 1 is a schematic perspective view of a light-dispersion-type LCD.
Figure 2:
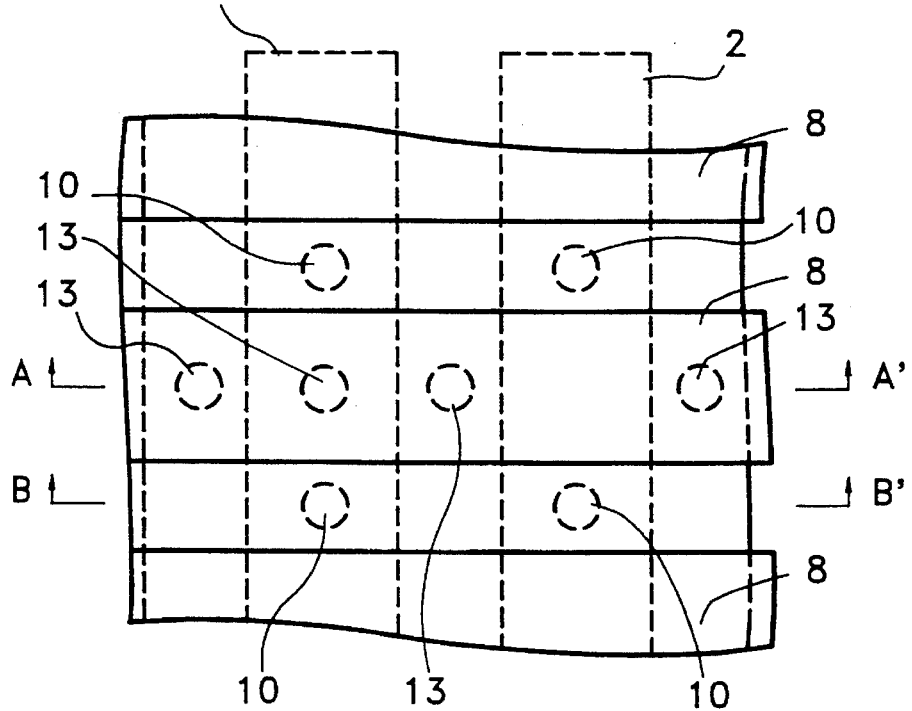
FIG. 2 is partly extracted plan view of the light-dispersion-type LCD shown in FIG. 1.
Figure 3A:
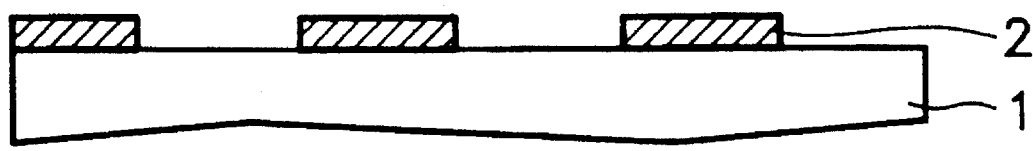
FIGS. 3A–9B are cross-sectional views of the light-dispersion-type LCD shown in FIG. 1, each of which illustrates a manufacturing step, wherein the figures with a suffix A are sectional views along the line A–A' of FIG. 2, and the figures with a suffix B are sectional views along the line B–B' of FIG. 2.
Figure 3B:
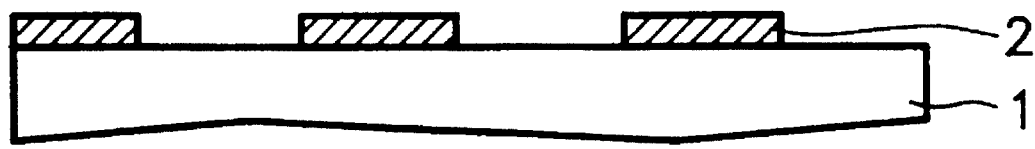
Figure 4A:
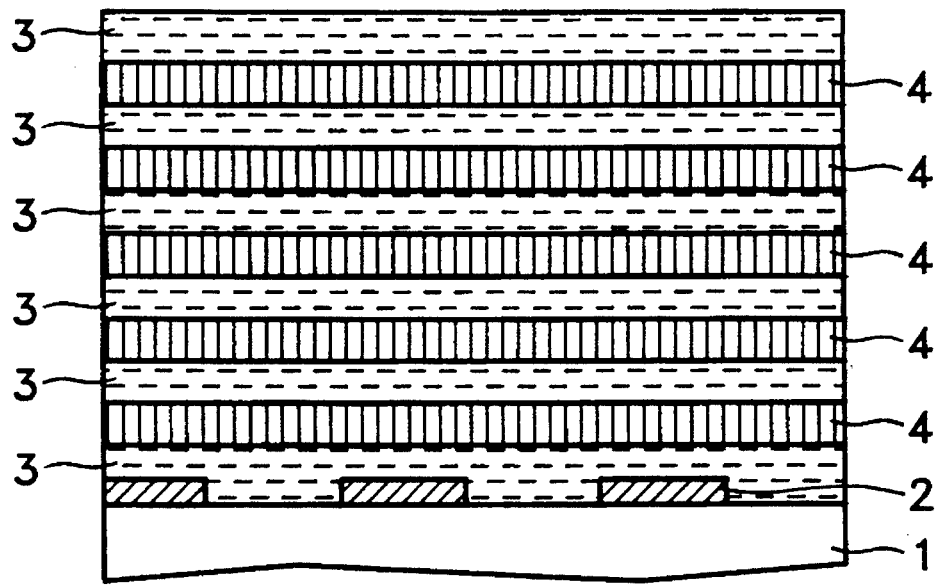
Figure 4B:
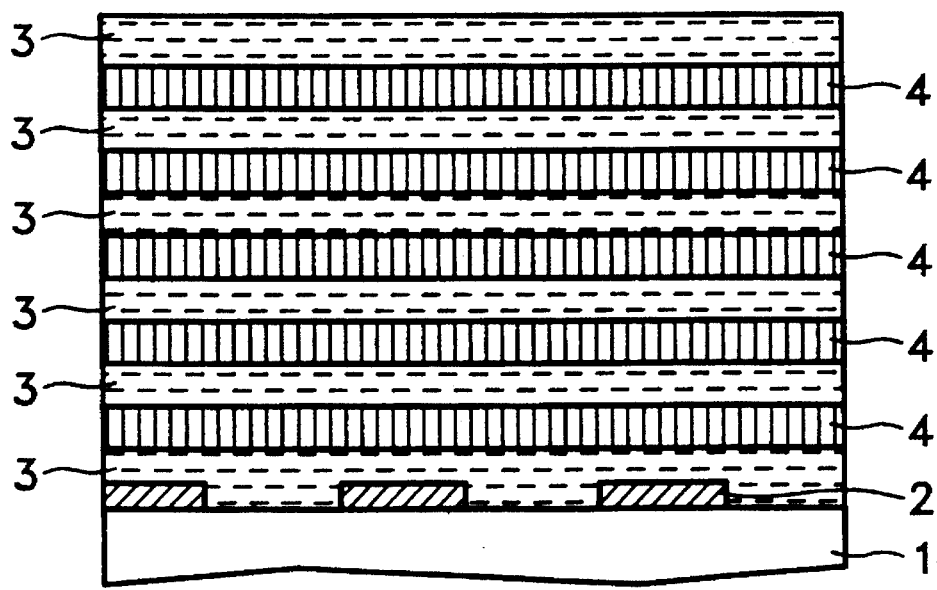
Figure 5A:
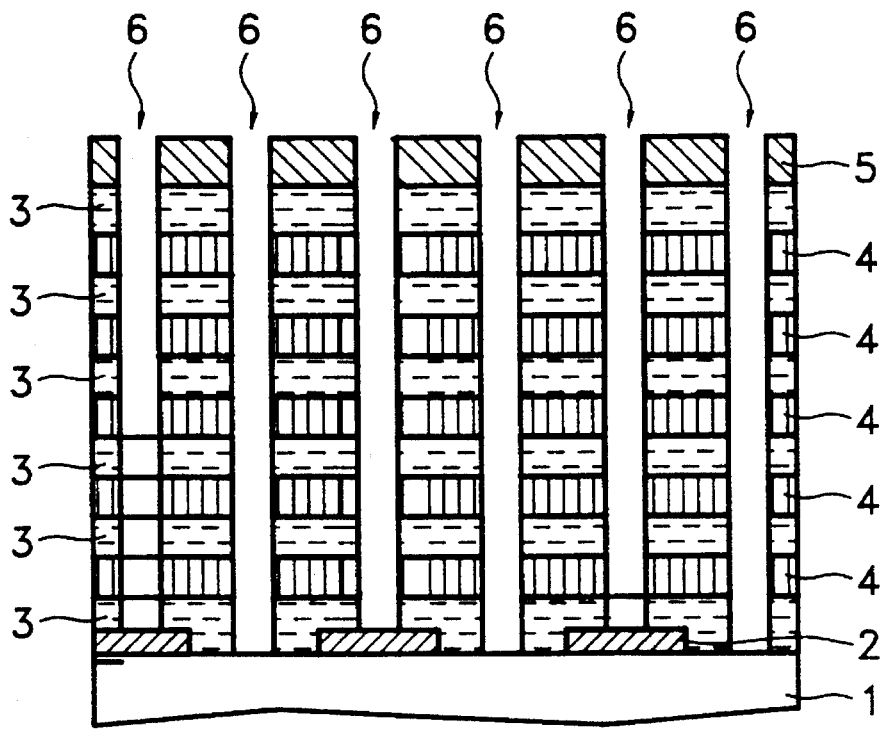
Figure 5B:
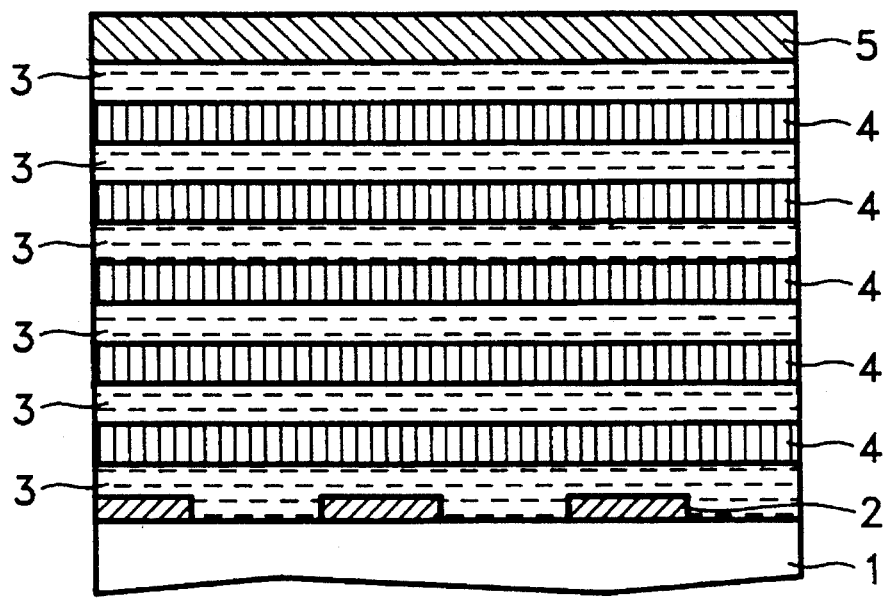
Figure 6A:
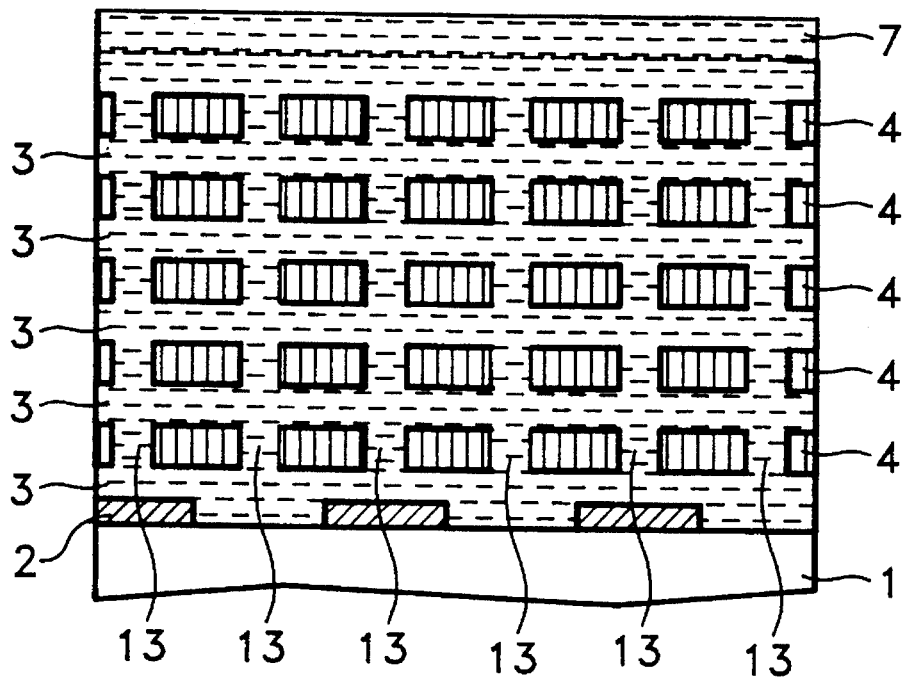
Figure 6B:
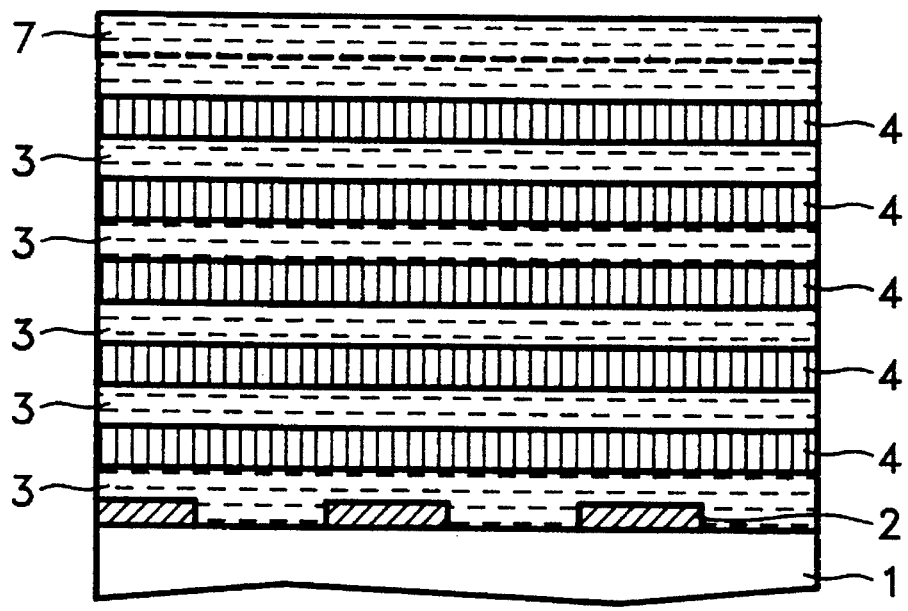
Figure 7A:
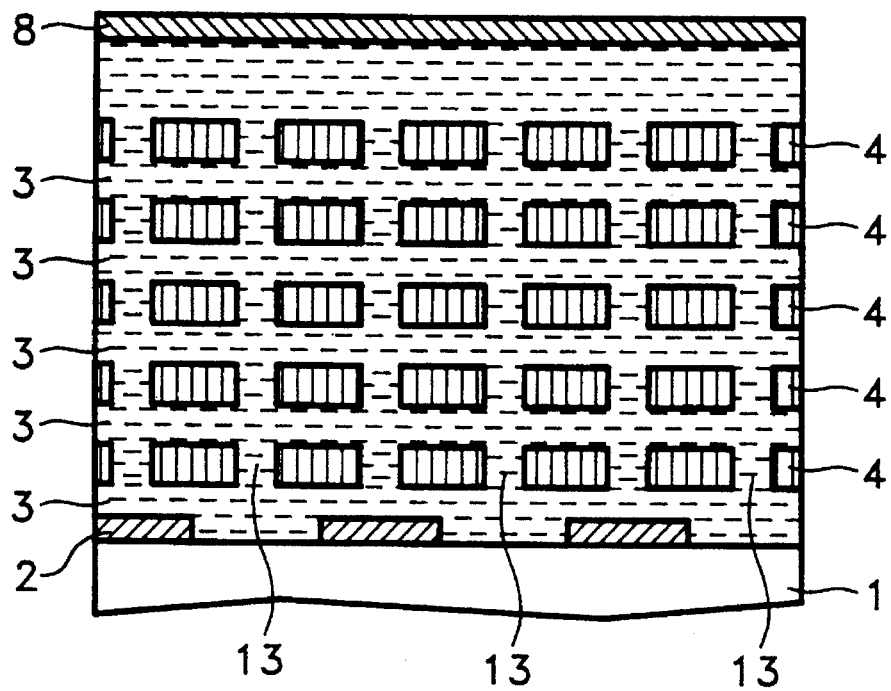
Figure 7B:
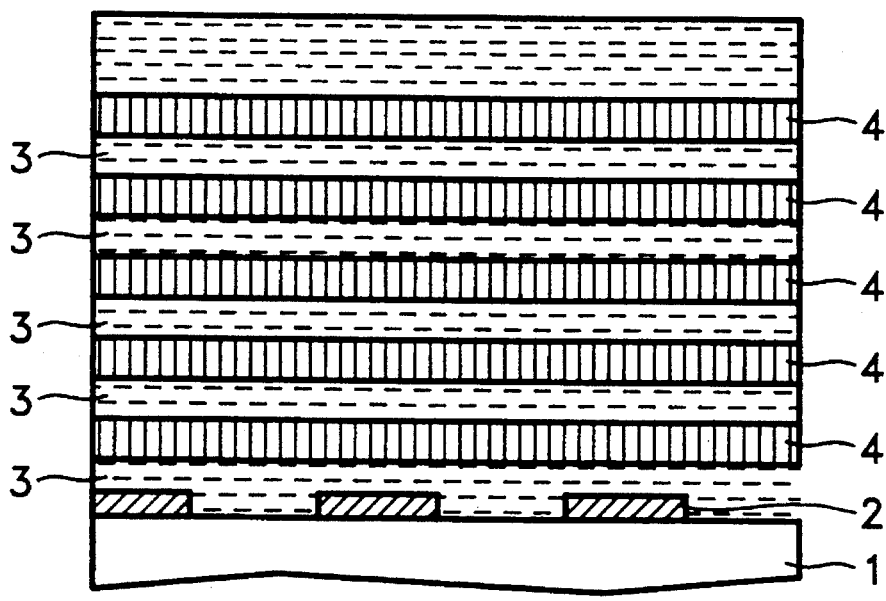
Figure 8A:
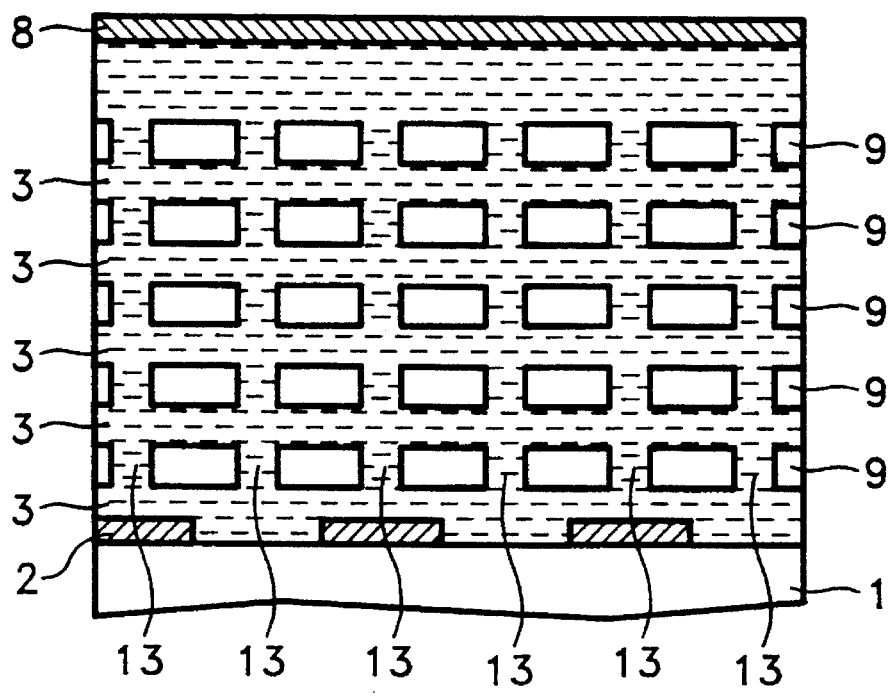
Figure 8B:
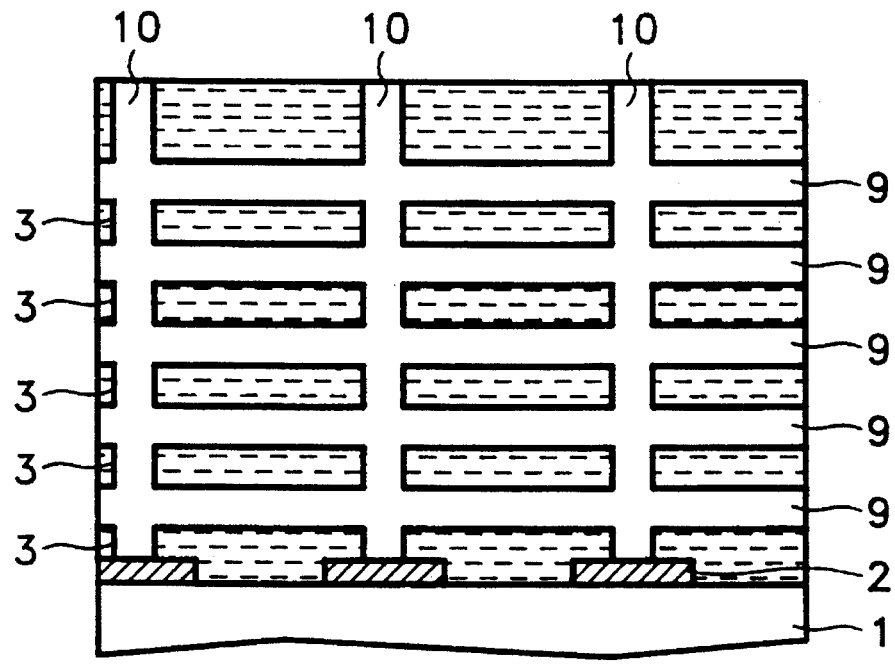
Figure 9A:
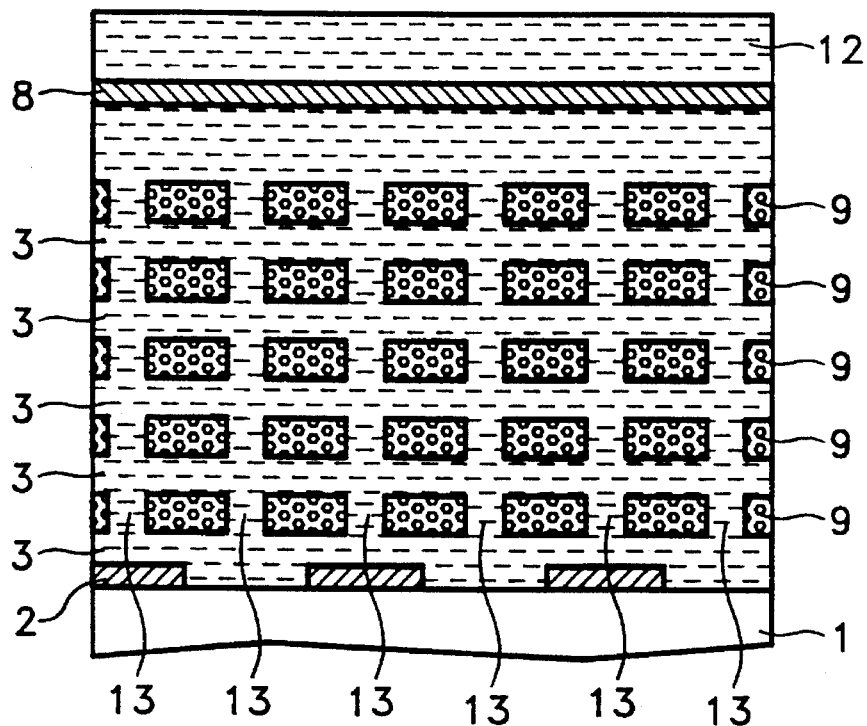
Figure 9B:
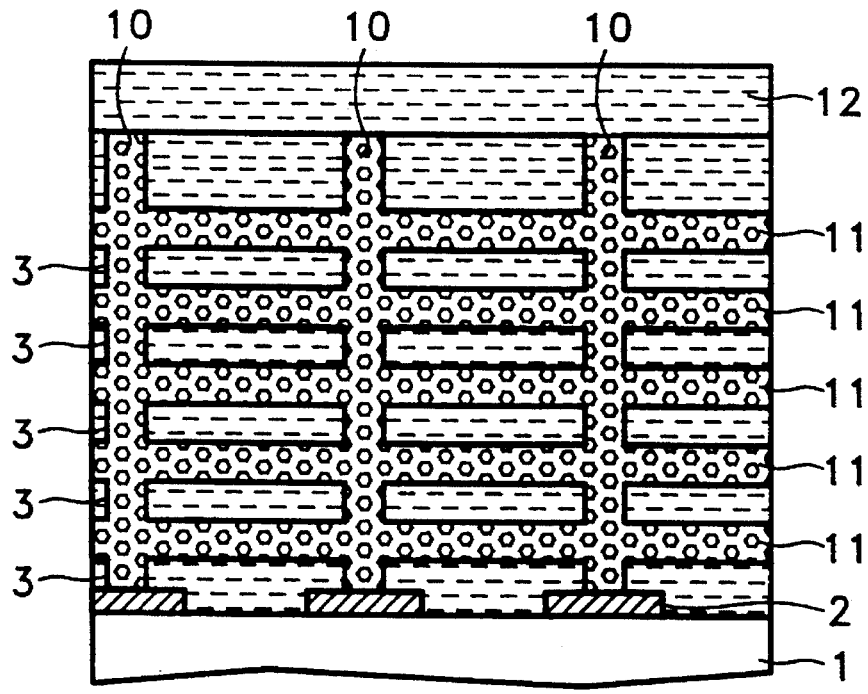

The LCD device manufactured according to the present invention is as constructed as shown in FIGS. 1 and 2. Hereinafter, FIGS. 10A, 11A, 12A, 13A, 14A and 15A are sectional views along line A–A' of FIG. 2, and FIGS. 10B, 11B, 12B, 13B, 14B and 15B are sectional views along line B–B' of FIG. 2.

In accordance with an embodiment of the present invention, a manufacturing method will be described in more detail.

Figure 10A:
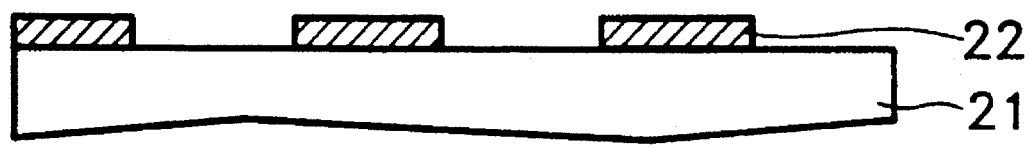
FIGS. 10A–15B are cross-sectional views of a light-dispersion-type LCD according the present invention, each of which illustrates a manufacturing step, wherein the figures with a suffix A are sectional views along the line A–A' of FIG. 2, and the figures with a suffix B are sectional views along the line B–B' of FIG. 2.
Figure 10B:
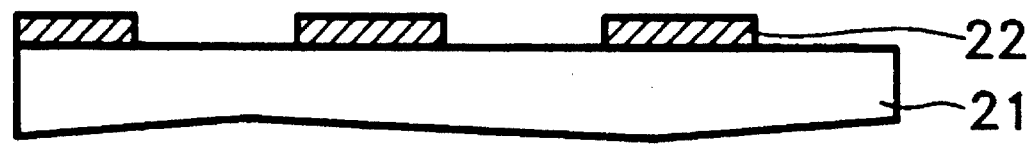

(a) A first ITO which is a kind of conductive material is deposited with the aid of a sputtering apparatus on a glass substrate 21. Then, with the aid of a first photolithography step, a first electrode 22 is formed into a predetermined pattern such as a plurality of parallel stripes (FIGS. 10A and 10B).

(b) a light-transmitting acrylic resin (or polyimide) is coated to a thickness of 3000–4000 Å on the surface of substrate 21 on which first electrode 22 is already formed, using a spin coating method or roll coating method. Then, a baking is performed so that an insulation layer 23 is formed on the whole surface of the resultant (FIGS. 11A and 11B).

(c) A photosensitive resin, e.g., positive photoresist, is spin-coated to a thickness of 4000–10000 Å on the surface of insulation layer 23. Thereafter, baking is performed so that medium layer 24 is formed on the whole surface of the resultant (FIGS. 11A and 11B).

Figure 11A:
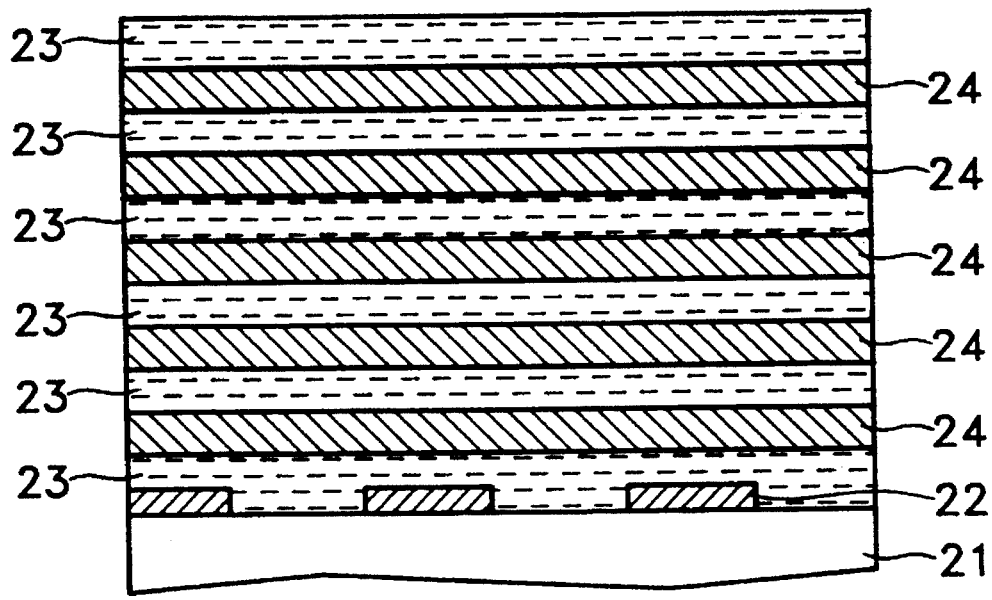
Figure 11B:
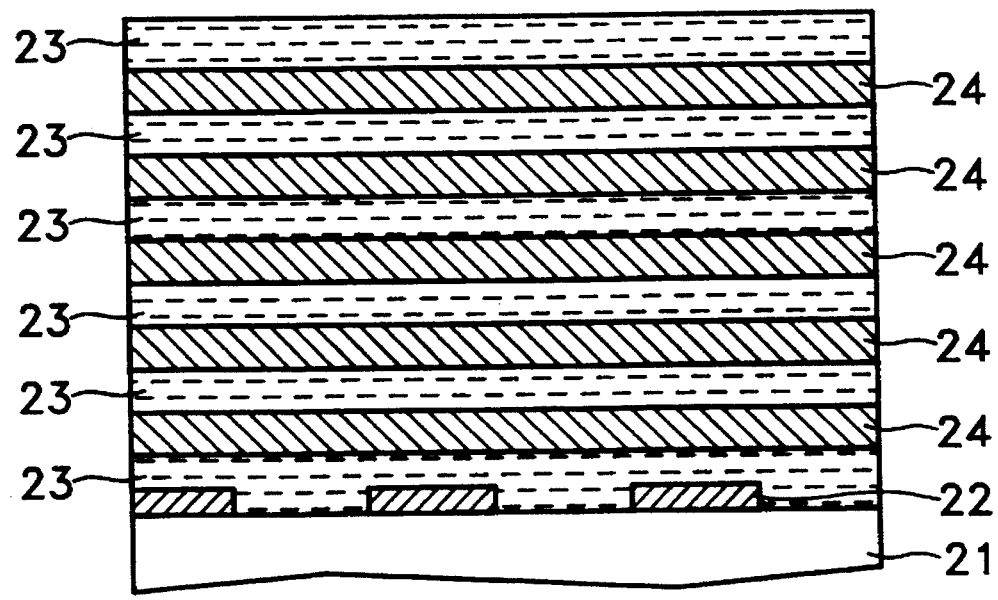

(d) Steps (b) and (c) are repeated a predetermined number of times, so as to provide a multilayer lamination structure composed of medium layers 24 and insulation layers 23 in which columns and liquid-crystal-filling-cavities are to be formed in later steps (FIGS. 11A and 11B). As shown in FIGS. 11A and 11B, the multilayer lamination structure resulting from this step typically finished with an insulating layer 23 as the upper most layer.

Figure 12A:
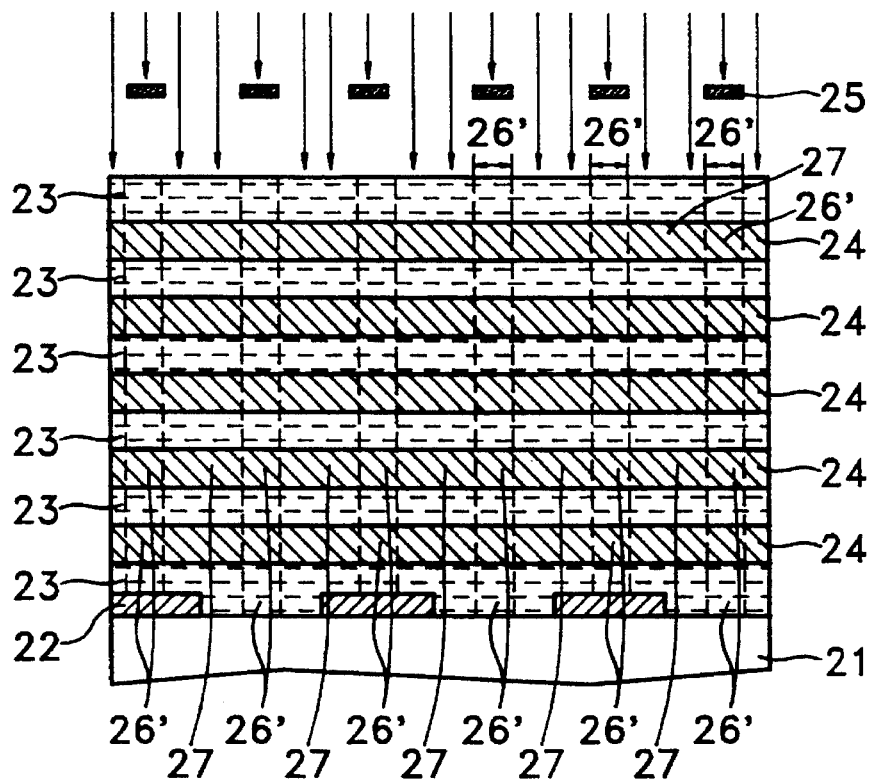
Figure 12B:
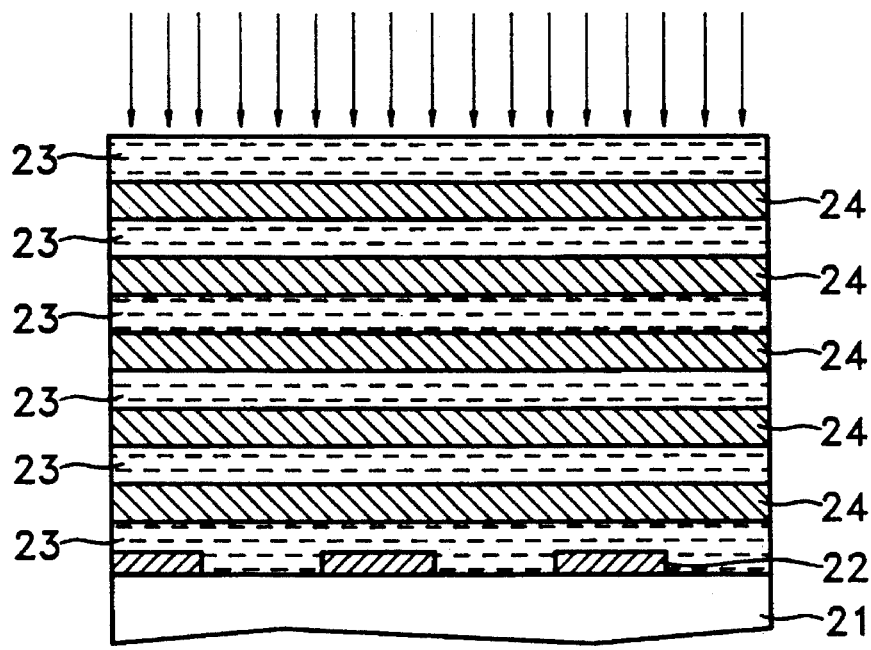

(e) A photomask 25 is applied to the multilayer lamination structure which is formed by steps (b) through (d), and thereby all portions except regions 26' for forming columns are exposed by the irradiation of light. Thus, exposed liquid crystal regions 27 and unexposed column regions 26' are formed through medium layer region 24 (FIGS. 12A and 12B).

Figure 13A:
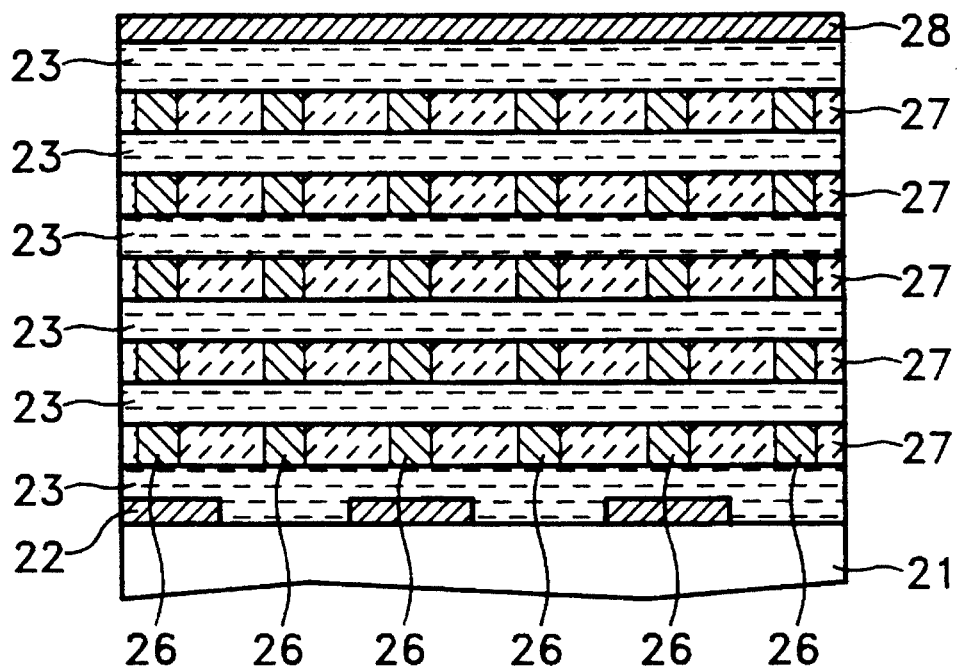
Figure 13B:
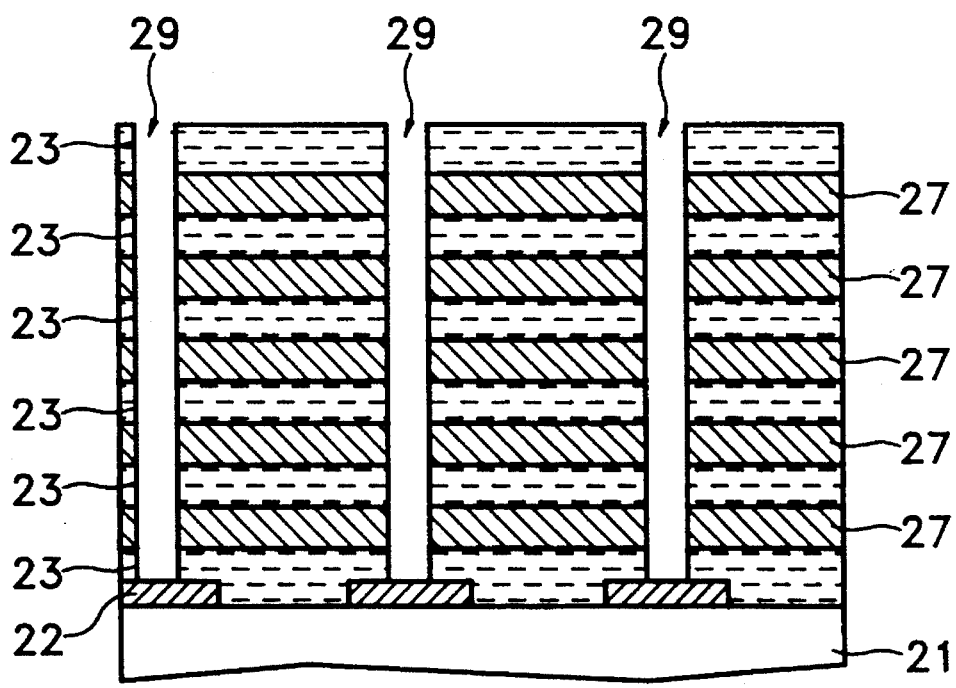

(f) A second ITO is deposited on the surface of the topmost insulation layer 23, with the aid of a sputtering apparatus. Then, a second photolithographic step is performed so that second electrode 28 which corresponds to first electrode 22 is formed into a predetermined pattern, i.e., a plurality of parallel stripes which are perpendicular to first electrode 22, above columns 26 (FIGS. 13A and 13B).

(g) A photoresist is coated on the lamination structure obtained via steps (b) through (f). Then, a third photolithographic step is performed thereupon, and thereby well-shaped liquid crystal inlet holes 29 for the injection of the liquid crystal are formed to reach first electrode 22 by an RIE dry-etching method with an aid of $CF_4$ and $O_2$ gases (FIGS. 13A and 13B).

Figure 14A:
Figure 14B:
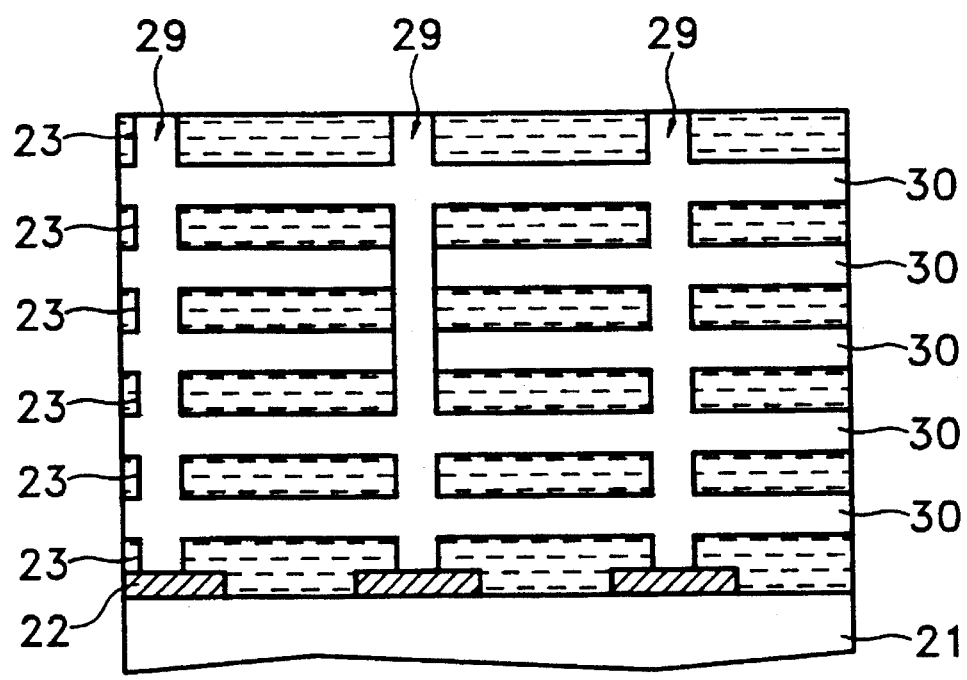

(h) A developer, of a kind of etchant, is injected through liquid crystal inlet holes 29 to dissolve and remove the exposed liquid crystal regions 27. As a result, liquid crystal inlet holes 29 and liquid crystal regions 27 become cavities 30. The insulating layer 23 and unexposed column region 26 remain and the remaining unexposed column regions 26 serve as spacers between insulating layers 23. (FIGS. 14A and 14B).

Figure 15A:
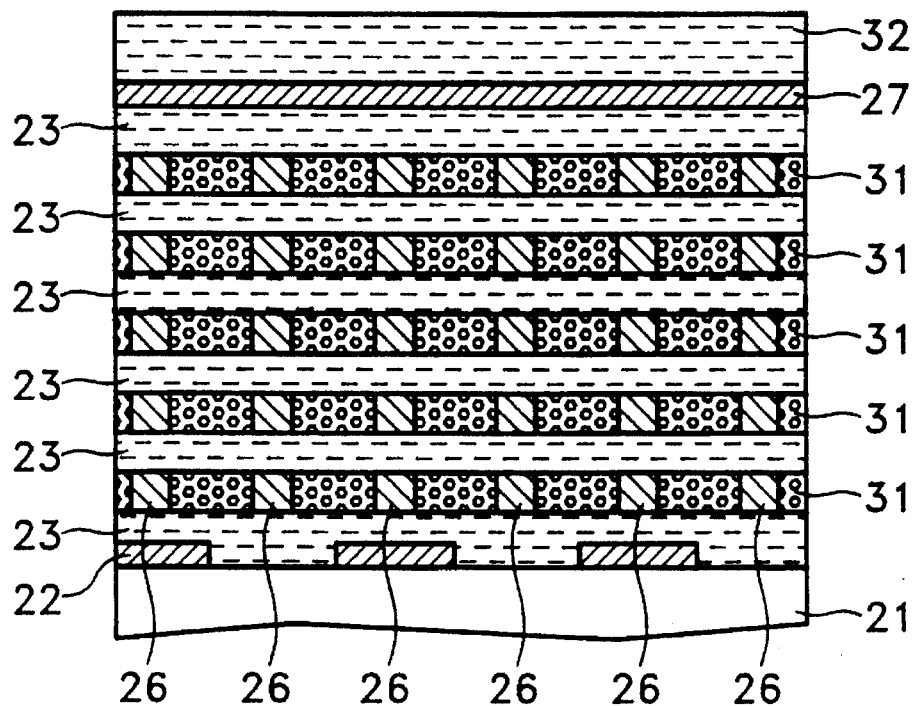
Figure 15B:
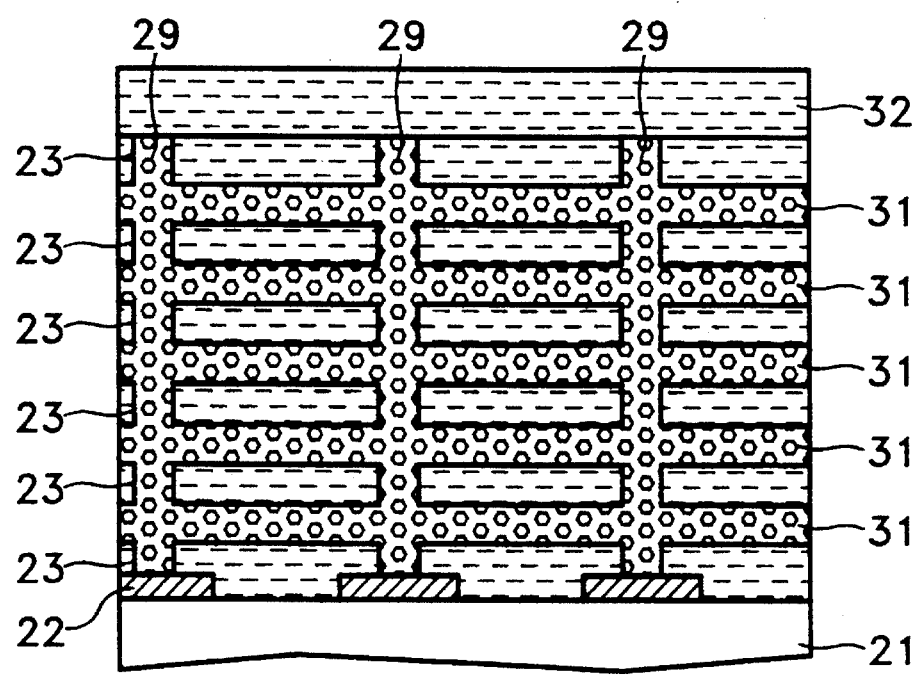

(i) The partially completed LCD obtained by the above steps is placed in a vacuum chamber for a long time. A reasonable amount of liquid crystal is then spread on the upper portions of liquid crystal inlet holes 29. Then, the pressure within the chamber is gradually increased to the ambient atmospheric pressure. As a result, the liquid crystal fills cavities 30 partitioned by insulation layers 23 and unexposed regions 26, i.e., columns, to thereby form a liquid crystal layer 31 (FIGS. 15A and 15B).

(j) After the liquid crystal injection completes, liquid crystal inlet holes 29 are sealed with a light-transmitting insulation acrylic resin. Then, second electrode 28 is covered with the same to thereby form a protective layer 32. Also, pads (not shown) are established for the connection with integrated elements (FIGS. 15A and 15B).

As described above, in the present invention, the step for forming the columns is performed by a partial exposure with the aid of a photomask, to thereby reduce the number of steps. In other words, one step of photolithography is eliminated from the previously proposed manufacturing method, so that the steps of photoresist coating, exposure for forming columns, development, hard baking (i.e., hardening the photoresist for etching), etching, photoresist stripping, insulating resin layer coating and baking can also be curtailed.

In addition, since the columns are formed by a partial exposure (not an etching), the holes for forming columns are not formed, so that after one application of acrylic resin is coated to form the insulation layer, all improved flatness can be obtained in regard to the insulation layer. Thereafter, when the second ITO is deposited, better step coverage is obtained, so that the lifting of second electrodes can be prevented during the step of etching (or developing) the dissolution layer through the liquid crystal inlet holes.

In accordance with the present invention, steps for forming columns can be shortened somewhat, to thereby provide a method for manufacturing a light-diffusion-type LCD having improved structure.

It should be understood that the embodiment described has no limiting nature on the scope of the invention, and that modifications can be made which in that way do not depart from the scope of the invention.

For example, it is therefore possible to modify the cylindrical columns into a variety of shapes. Moreover, the columns within the pixels formed by the crossing of the first and second electrode groups can be removed. Furthermore, the second electrode group can be formed after the filling of liquid crystal and the sealing of the liquid crystal inlet holes.

What is claimed is:

1. A method for manufacturing an LCD device, comprising the steps of:

forming a patterned first electrode over a substrate;

forming a light-transmitting insulating layer over said patterned first electrode and exposed portions of said substrate;

forming a photosensitive medium layer over said insulating layer;

forming another light-transmitting insulating layer over said photosensitive medium layer;

alternately performing said forming a photosensitive medium layer and said forming another light-transmitting insulating layer a selected number of times, to thereby form a multilayer laminated structure comprised of a plurality of insulating layers and photosensitive medium layers, an uppermost layer of said multilayer laminated structure comprising a final insulating layer;

positioning a patterned photomask above said final insulating layer and irradiating portions of said multilayer laminated structure not covered by said patterned photomask, to thereby create exposed regions and unexposed regions within each of said photosensitive medium layers;

forming a patterned second electrode over said final insulating layer, said patterned second electrode covering first portions of an upper surface of said final insulating layer, with second portions of said upper surface of said final insulating layer being left uncovered by said patterned second electrode;

forming inlet holes in said multilayer structure, each of said inlet holes extending from said second portions of said upper surface of said final insulating layer down to an upper surface of said patterned first electrode;

applying a developer through said inlet holes to dissolve said exposed regions in each of said photosensitive medium layers, to thereby form a plurality of layered cavities in communication with said inlet holes; and, filling each of said inlet holes and each of said plurality of layered cavities with liquid crystal material.

2. The method as set forth in claim 1, further comprising, after the step of filling, the step of forming a protective, light-transmitting layer over said patterned second electrode and said second portions of said upper surface of said final insulating layer.

3. A method for manufacturing an LCD device, comprising the steps of:

forming a patterned first electrode over a substrate;

forming a light-transmitting insulating layer over said patterned first electrode and exposed portions of said substrate;

forming a photosensitive medium layer over said insulating layer;

forming another light-transmitting insulating layer over said photosensitive medium layer;

alternately performing said forming a photosensitive medium layer and said forming another light-transmitting insulating layer a selected number of times, to thereby form a multilayer laminated structure comprised of a plurality of insulating layers and photosensitive medium layers, an uppermost layer of said multilayer laminated structure comprising a final insulating layer;

positioning a patterned photomask above said final insulating layer and irradiating portions of said multilayer laminated structure not covered by said patterned photomask, to thereby create exposed regions and unexposed regions within each of said photosensitive medium layers;

forming inlet holes in said multilayer structure, each of said inlet holes extending from an upper surface of said final insulating layer down to an upper surface of said patterned first electrode;

applying a developer through said inlet holes to dissolve said exposed regions in each of said photosensitive medium layers, to thereby form a plurality of layered cavities in communication with said inlet holes;

filling each of said inlet holes and each of said plurality of layered cavities with liquid crystal material; and, forming a patterned second electrode over said final insulating layer, said patterned second electrode covering first portions of an upper surface of said final insulating layer, with second portions of said upper surface of said final insulating layer being left uncovered by said patterned second electrode.

4. The method as set forth in claim 3, further comprising the step of forming a protective, light-transmitting layer over said patterned second electrode and said second portions of said upper surface of said final insulating layer.

* * * * *